Feb. 3, 1925.
G. ALBERS
GROATS COOKER
Filed May 24, 1924
1,525,259
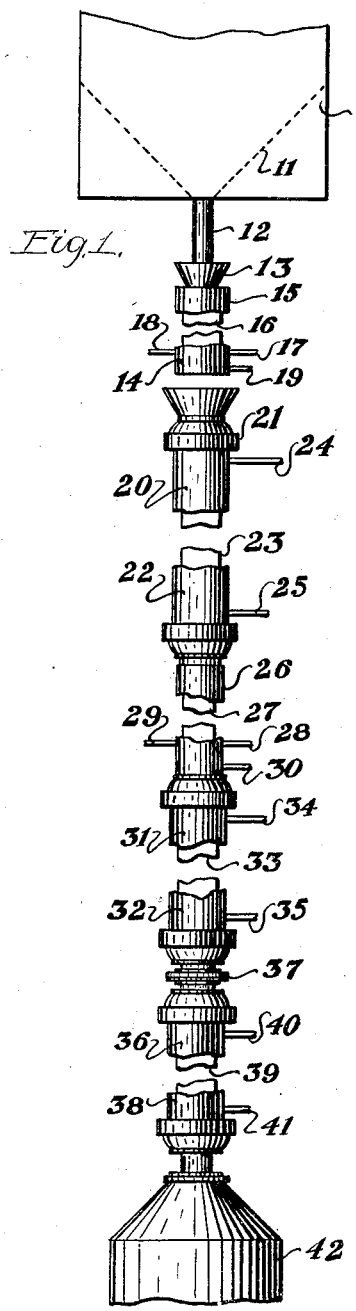
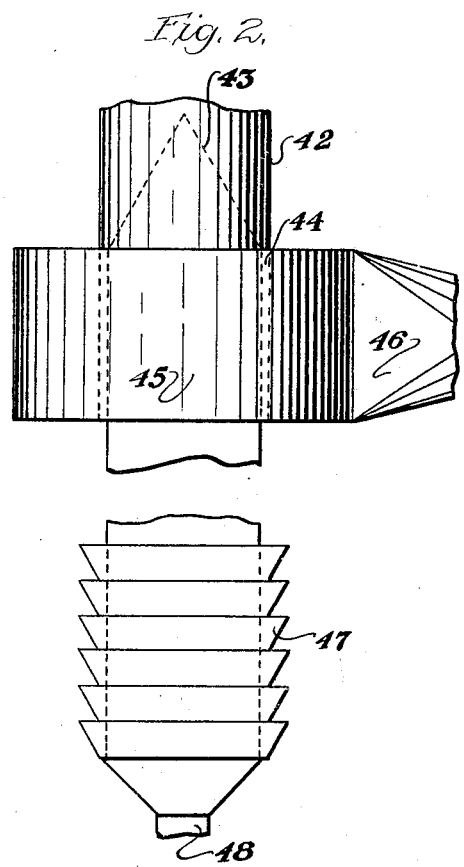
INVENTOR.
George Albers.
BY Arthur E Wallace
ATTORNEY.

Patented Feb. 3, 1925.

1,525,259

UNITED STATES PATENT OFFICE.

GEORGE ALBERS, OF SEATTLE, WASHINGTON.

GROATS COOKER.

Application filed May 24, 1924. Serial No. 715,549.

*To all whom it may concern:*

Be it known that I, GEORGE ALBERS, a citizen of the United States, residing at Seattle, county of King, and State of Washington, have invented new and useful Improvements in Groats Cookers, of which the following is a specification.

The present invention relates to the manufacture or production of cooked groats, and particularly oat groats.

The apparatus illustrated is so designed that the cooking of the groats is accomplished in a continuous process in a double tube, steam being employed directly and indirectly to provide the necessary heat, the cooked whole groats being dried after cooking, that they may be held for storage purposes.

The objects of the invention, therefore, include the provision of a novel apparatus for cooking groats, as well as a novel cooking process, a unique arrangement of the cooking apparatus, and the combination of various steps of cooking and processing for the procurement of a better finished cooked groat.

These, and such other objects as may hereinafter appear, are attained by the novel construction, combination, and arrangement of the various elements of the apparatus, which is illustrated in the accompanying single sheet of drawing, in which the two figures should be united to disclose a single continuous vertical device, having portions broken away in the drawing for convenience of illustration.

Figures 1 and 2 are elevations of the apparatus, Figure 2 being a continuation of Figure 1, parts of the apparatus being broken away in order to illustrate the device in a single sheet of drawing.

Like reference characters are used to designate similar parts in the drawing and in the specification which follows.

Groats are elevated to a receiving tank 10 having a converging bottom 11 terminating in a centrally disposed discharge pipe 12. From the receiving tank 10, the groats are discharged into a hopper 13, from whence the groats automatically are fed into a steam cooker 14, hereinafter referred to as the first steam cooker, and wherein superheated steam is applied directly to the groats. Said steamer 14 comprises a shell 15, an internal chamber or vessel 16 arranged concentrically of said shell 15, steam pipes 17 and 18, and a drain 19.

From the first steam cooker, the groats pass into a double jacketed vessel or tube 20 through a reducer 21, the exterior and interior walls of vessel 20 being designated, respectively, 22 and 23. Steam is admitted to this section of the apparatus through steam pipe 24, and the vessel is drained through drain pipe 25. In vessel 20, steam is applied indirectly and not directly.

From said vessel 20, the groats pass into a steamer 26, where direct steam is again applied to the groats. A concentrically disposed inner wall in steamer 26 is designated 27, and steam pipes leading into said vessel are designated 28 and 29, and the drain pipe 30.

Out of the second steamer 26, the groats pass into coupled double steam jacketed vessels, the upper 31 comprising a shell 32, a concentrically arranged inner chamber 33, steam pipe 34 and drain pipe 35, and the lower 36 joined to the former 31 by flange union 37, comprising outer shell 38, inner wall 39, steam pipe 40, and drain 41.

The direct steam cookers 14 and 26 are relatively short vessels, while the vessels 20, 31 and 36, where steam is indirectly applied to the groats, are relatively long, two or three times greater in length than the direct steam cooking sections 14 and 26.

From the coupled indirect steam cookers 31 and 36, the groats are discharged into a cooking or tempering tank 42, from whence the cooked groats are spread by an inverted cone-shaped bottom 43 into a plurality of perforated cylinders 44 surrounded by air and wind trunks 45 and 46, respectively.

Out of the said cylinders, the groats are transferred into a cooler 47, from whence, by an automatic discharge 48 regulating the flow of the groats, the cooked and cooled groats are discharged from the apparatus preparatory to entering an elevator for rolling.

In the process of cooking the groats, there is a continuous flow from the hooper or bin at the top to the discharge orifice at the bottom. It is an essential factor in the cooking of this product that it move continuously through the cooking apparatus, for otherwise it could not be so handled. If the groats, during their cooking processes, were allowed to pause in their movement downward through the cooking apparatus, the groats would choke the cooking apparatus, for there is a swelling of the product during the entire cooking and steaming thereof. The discharge from the cooker, therefore, controls the speed with which the groats pass through the apparatus and also governs the admission of groats thereto.

Considerable steam is condensed during the cooking process. Each cooking section of the apparatus is, therefore, supplied with a drain pipe as indicated. In the cooking process, cooked groats are distributed by the cone bottom 43 of the cooking tank 42, so that the cooked groats will pass through the perforated cylinders 44, where the groats are cooled by a fan (not shown) driving cooling air through wind trunk 46. The top of each of the perforated cylinders 44 is open, exposing the groats to the air and admitting of air being forced through them. The usual time required for groats to pass from the bin at the top of the apparatus to the discharge orifice 48 is fifty minutes to one hour, the rapidity of flow, as hereinabove indicated, being determined by the discharge of the cooked and cooled groats through the discharge opening 48.

I claim:

1. A cooking apparatus for the continuous cooking of groats and the like comprising in combination, a receiving vessel, a steam cooker for the direct application of steam, a cooker indirectly employing steam, a tempering tank, and a cooling section, each of said elements being superposed one upon another.

2. A continuous cooking apparatus comprising, in combination, a receiving vessel, a plurality of steam cookers for the direct application of steam, a plurality of vessels for indirectly employing steam, a tempering tank, and a cooling section, all of said elements being superposed one upon another, whereby the article to be cooked and cooled is conveyed through said apparatus by the force of gravity.

GEORGE ALBERS.